US 6,581,861 B1

(12) United States Patent
Rejc et al.

(10) Patent No.: US 6,581,861 B1
(45) Date of Patent: Jun. 24, 2003

(54) UNIT FOR PROCESSING INDUSTRIAL RUBBER AND PLASTIC WASTE

(76) Inventors: Ota Rejc, Liliova 36 301 60, Plzen (CZ); Jiri Riha, Francouzska 45, 307 06 Plzen (CZ); Eduard Gutfreud, Nyranska 4, 323 27 Plzen (CZ); Jan Jenicek, Pod Chlumen 12, 312 15 Plzen (CZ); Petr Lukesch, Irisstrasse 7, D-809835, Munich (DE); Jaroslav Sus, Lilova 36, 301 60 Plzen (CZ)

( * ) Notice: Subject to any disclaimer, the term of this patent is extended or adjusted under 35 U.S.C. 154(b) by 0 days.

(21) Appl. No.: 09/744,032

(22) PCT Filed: Feb. 8, 1999

(86) PCT No.: PCT/CZ99/00004

§ 371 (c)(1),
(2), (4) Date: Feb. 15, 2001

(87) PCT Pub. No.: WO00/03853

PCT Pub. Date: Jan. 27, 2000

(30) Foreign Application Priority Data

Jul. 17, 1998 (CZ) .............................. 2257-98

(51) Int. Cl.⁷ ............................................. B02C 19/12
(52) U.S. Cl. ............................... 241/159; 241/DIG. 31; 241/DIG. 38
(58) Field of Search ................ 241/65, 159, DIG. 31, 241/DIG. 38, DIG. 14

(56) References Cited

U.S. PATENT DOCUMENTS 2,211,838 A * 8/1940 Riggs .......................... 134/15
4,836,459 A * 6/1989 Holl et al. ........... 241/DIG. 31
5,100,063 A * 3/1992 Bauer .......................... 241/14
5,385,307 A * 1/1995 Azar ................... 241/DIG. 31
5,887,803 A * 3/1999 Dietrich et al. ............... 241/23
6,168,103 B1 * 1/2001 Agostinelli et al. ......... 241/159

FOREIGN PATENT DOCUMENTS

| DE | 4020227 | * | 1/1992 |
| DE | 19617450 | * | 11/1997 |
| DE | 19648551 | * | 5/1998 |
| WO | WO 94/07670 | * | 4/1994 |

* cited by examiner

Primary Examiner—Mark Rosenbaum
(74) Attorney, Agent, or Firm—Hovey Williams LLP

(57) ABSTRACT

The unit for processing industrial rubber and plastic waste consists of a gasproof chamber (1), in which upper rollers (2) and lower rollers (3) are located in rows. The processed waste (4) passes between them, between the input and the output of the chamber (1). The lower rollers (3) are fixed in their position and the upper rollers are movable and attached by means of springs (5), which press them on the waste (4). The rollers (2 and 3) counter-rotate and the upper rollers (2) have projections (8) on their surface. The input area (10) with the input lifting closure (12) is placed on one front outer wall of the chamber (1) and the output area (14) with the output lifting closure (16) is placed on the opposite front outer wall of the chamber (1). Each area (10 and 14) is provided with a gas pipe (13) is located on the outer bottom wall of the chamber (1) and is separated from the chamber (1) by the inner lifting closure (11). In the alternative type the unit consists of at least two joined unit-built chambers (1), the input area (10) with the input lifting closure (12) is located on one front outer wall of the unit. The output area (14) with the output lifting closure (16) is located on the opposite front outer wall of the unit.

11 Claims, 3 Drawing Sheets

UNIT FOR PROCESSING INDUSTRIAL RUBBER AND PLASTIC WASTE

BACKGROUND OF THE INVENTION

1. Field of the Invention

The invention concerns a unit for processing industrial rubber and plastic waste in a physico-chemical way.

2. Description of the Prior Art

The current machines for processing rubber and plastic waste are either mechanical only or they process waste in a physical-chemical way by means of gases or under extreme physical conditions, e.g. under high or extra low temperatures.

One of the methods of rubber waste liquidation is the process according to the WO-94/07670 patent, which uses liquid nitrogen as a gas medium, evaporates and thus causes extremely low temperatures, which cause rubber hardening. This method is disadvantageous in that it is highly energy-consuming and outstandingly corn plicated as regards to engineering equipment. The equipment that we claim works at atmospheric temperatures on a totally different physical-chemical basis, the gas medium is not nitrogen, but ozone. A total difference of mechanism configuration and detailed arrangement of the production line, which is the subject matter of our patent claim, follows from it.

The disadvantage of all these systems known so far is a considerable energy consumption of both the mechanical way and the preparation of physical-technical conditions under which the waste is processed. These systems often pollute the environment and there is often a problem to separate the single parts of various materials after the waste is processed.

Ecological operation of those systems is also questionable due to initial investments and operational costs.

SUMMARY OF THE INVENTION

The invention of the unit for industrial rubber and plastic waste using the physical-chemical way eliminates the above mentioned disadvantages.

The unit consists of a gastight chamber, in which two rows of rollers are located: the upper and lower ones. The processed waste passes between them, from the input to the output openings of the chamber. The lower bearings of rollers are firmly fixed whereas the upper ones are movable and are attached by means of springs which press them on the passing waste. Both the rows of rollers counter-rotate.

In the alternative type the upper rollers have projections on the surface and there is an input area on the outer front wall of the chamber with a lifting closure, on the opposite outer wall there is an output area with the output lifting closure. Both those areas are provided with gas pipes and are separated from the chamber by lifting closures. On the outer bottom wall of the chamber there is a discharge chute with the outer lifting closure and a gas pipe. The chute is separated from the chamber by a lifting closure.

The advantageous type consists of at least two joined unit-built chambers. The input area with the input lifting closure is on one front outer wall of the unit and the output area with the output lifting closure is on the opposite front outer wall of the unit. In another alternative type there is a worm conveyer on the bottom wall inside the unit. The discharge chute is located under the outer front wall of the last chamber.

The roller bearings, which are outside the chambers, have flat packings pressed by a spring to the chamber wall at the spot where the shafts enter the chamber wall.

The upper and lower rollers are driven by joint shafts, whose bearings, located outside the chambers, can be moved on a frame and are provided with sprockets. The chain runs from them to the driving sprocket of the unit engine and the gearbox. Each upper roller and each lower roller can be driven by the driving engine, which operates independently, and is electronically controlled. The opening and closing times of all the closures can be electronically controlled in an interactive specified sequence.

In the next alternative type the upper and lower rollers are driven by joint shafts whose bearings are located on a frame outside the chambers and whose other ends are provided with toothed wheels mating with idlers and a drive toothed wheel.

The unit uses the erosive effect of gas simultanously with the mechanical processing of waste. The main working parts of the unit are two rows of rollers which move forward and simultanously deform the processed waste. The process takes place in a closed gastight chamber continuously, i.e. without any stop or breaks of the working cycles and under constant presence of gas as a working medium. The input and output areas, from which it is possible to exhaust gas in intervals given by the progress of the process, enable non-stop operation. After gas exhaustion it is possible to fill the input or output area with atmospheric air and thus enable either uninterrupted ecological supply of waste or product of f take after processing.

All drive mechanisms of the unit are placed outside the chamber. This placement reduces the exposure of the drive mechanisms to the erosive effect of gas within the chamber which is used in the processing of the waste as described above. In addition, placement of the drive mechanisms outside the chamber permit the adjustment of the rollers and their working movement independently of one another.

BRIEF DESCRIPTION OF THE DRAWINGS

The invention is explained in more detail by means of drawings.

FIG. 1 is a view of the basic type of the unit hereof with one chamber;

DETAILED DESCRIPTION OF THE DRAWING

EXAMPLES OF THE INVENTION

Example 1

Figure 1:
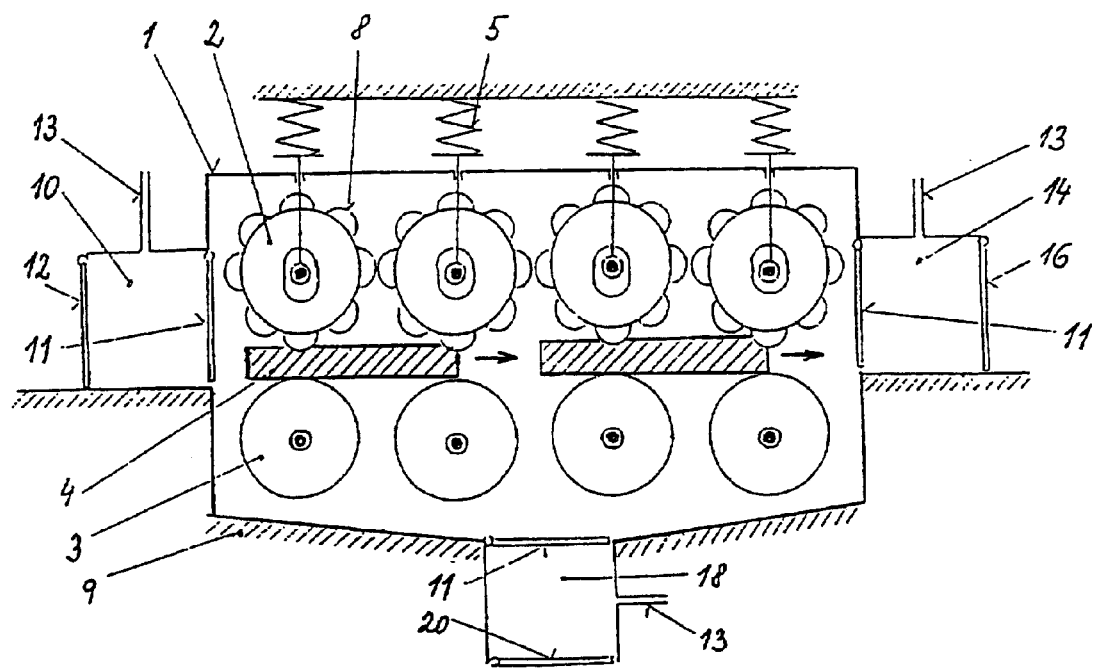
FIG. 1 is the basic type of the unit with one chamber.

The basic part of the unit is gastight chamber 1 having a rectangular cross section, which is filled with the working medium, and in which a row of upper rollers 2 is located above the row of lower rollers 3, processed waste 4 passes between them, which is shown in FIG. 1. Bearings of lower rollers 3, which can rotate only, have shafts firmly fixed against chamber 1. Upper rollers 2 are movable against chamber 1 vertically and are pressed on waste 4 by springs 5 either directly or are attached to balance beam 6 and are pressed by springs 5, which is shown in FIG. 1*a*. Upper rollers 2 have projections on their surface. Chamber 1 is firmly anchored on basic frame 2. Input area 10 is located on one outer front wall of chamber 1, which is separated from the chamber 1 area by inner lifting closure 11 and from the ambient atmosphere by input lifting closure 12.

Output area 14 with output lifting closure 16 is located on the output front wall of chamber 1. It is also separated from chamber 1 by inner lifting closure 11. Both areas 10 and 14 are provided with gaspipe 13.

Chamber 1 has discharge chute 18 with outer lifting closure 20 on tile outer bottom wall. It is separated from chamber 1 by inner lifting closure 11 and is also provided with gaspipe 13. The interactive sequence and opening times of closures 11, 12, 16 and 20 as well as gas exhaustion from areas 10 and 14 and chute 18 are electronically controlled.

Example 2

Figure 2:
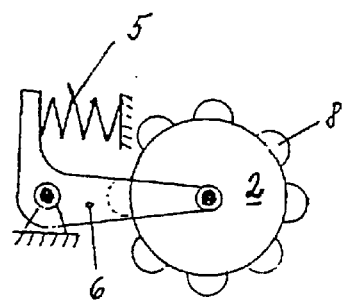
FIG. 2 is a view of the detail of the upper roller attachment to the balance beam.

If unit-built chambers are joined in a production line, in this case two chambers 1, input area 10 is located on the outer front wall of the first chamber 1 in line and output area 14 is located on the opposite outer front wall of the last chamber 1, in this case the second chamber. This is shown in FIG. 2.

Worm conveyer 22, which is driven by engine and gearbox 23, is located in the lower part of chamber 1 along its whole length. The conveyer empties itself into chute 18, which is separated from chamber 1 by inner lifting closure 11 and from the ambient atmosphere by outer lifting closure 20. Gas can be exhausted from chute 18 through gaspipe 13.

Figure 3:
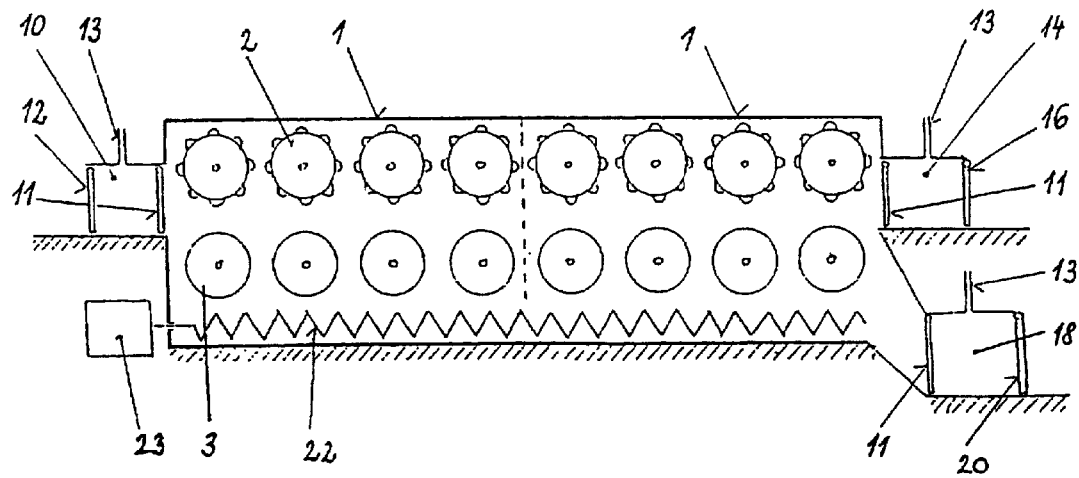
FIG. 3 is a view showing the joining of two unit-built chambers.
Figure 4:
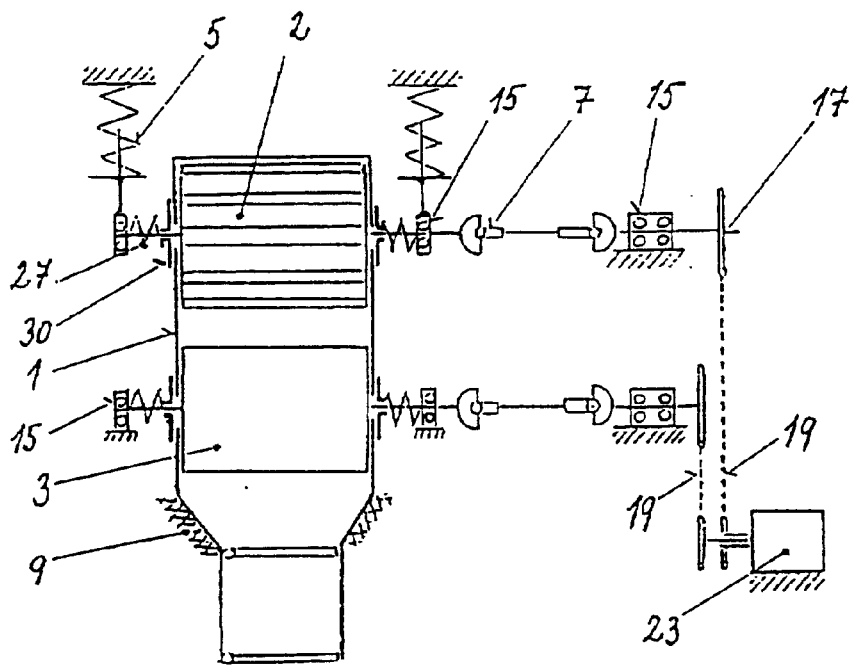
FIG. 4 is a view illustrating the driving mechanism of the unit with the claims.
Figure 5:
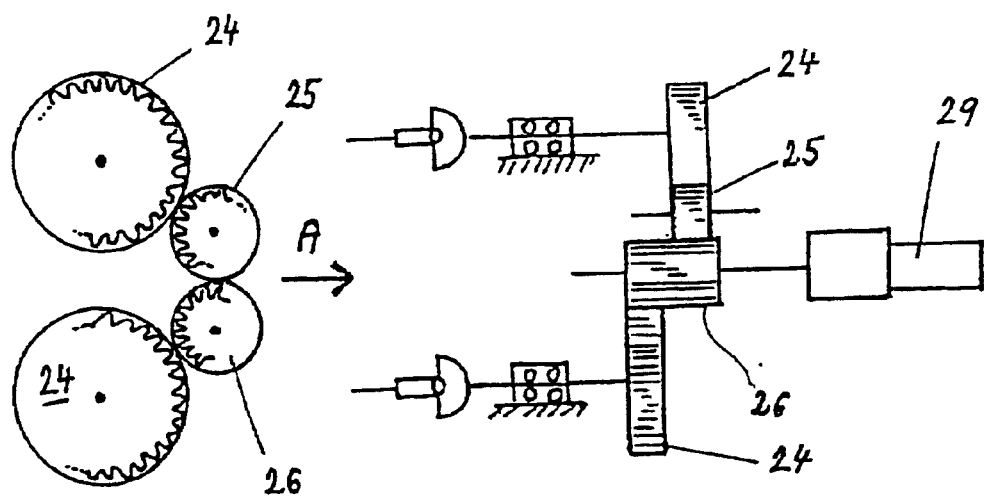
FIG. 5 is a view of the driving mechanism of the unit with toothed wheels.

Upper rollers 2 and lower rollers 3 are embedded in bearings 15, which is shown in FIG. 3. Bearings 15 are located outside the inner area of chamber 1 in the free atmosphere. Bearings 15 of lower rollers 3 are firmly embedded in frame 9, on which the production line or the unit is placed. Bearings 15 of upper rollers 2 are located, with regards to chamber 1, on a movable structure controlled by springs 5, which is shown in FIG. 1.

The openings in the wall of chamber 1 for the shafts of rollers 2 and 3 are sealed by flat packings 30 pressed on the wall of chamber 1 by springs 27 to prevent gas leakage from chamber 1 into the atmosphere.

Rollers 2 and 3 are driven by joint shafts 7, their opposite ends are embedded in bearings 15, fixed in an adjustable way on frame 9. Sprockets 17 are placed at the shaft ends and the whole unit is driven by chains 19 from the engine with gearbox 23.

The unit works in the following way: rollers 2 and 3 counter—rotate and shift the processed material in the right direction. The projections on the surface of upper rollers 2 deform waste 4 during rotation.

After opening or closing lifting closures 11, 12 and 16 input area 10 and output area 14 can be filled either with gas working medium or atmospheric air and at the same time chamber 1 is continuously filled with gas working medium.

The loose reusable product of the process passes through discharge chute 18, the rests of the waste having a different homogenic consistence from the reuseable waste leave the unit through output area 14.

The gearing and rotation direction of chain system 19 can be arbitrarily chosen or it can be replaced by a gear system with toothed wheels 24, 25, and 26.

INDUSTRIAL UTILIZATION

The unit according to the invention can be quickly and easily used in all branches of industry where industrial waste of rubber and plastic materials is processed for recycling.

LIST OF THE COMPONENTS AND THEIR NUMBERS 1. chamber
2. upper roller
3. lower roller
4. waste
5. spring
6. balance beam
7. joint shaft
8. projection
9. frame
10. input area
11. inner lifting closure
12. input lifting closure
13. gas pipe
14. output area
15. bearing
16. output lifting closure
17. sprocket
18. discharge chute
19. chain
20. outer lifting closure
21. driving sprocket
22. worm conveyer
23. engine and gearbox
24. toothed wheel
25. idler
26. driving toothed wheel
27. spring
29. driving engine
30. flat packing

What is claimed is:

1. A unit for processing industrial rubber and plastic waste in a physio-chemical way comprising a substantially gas-tight chamber having an input opening, an output opening and two rows of rollers located in the chamber, the upper row of rollers including bearings and the lower row of rollers having bearings positioned whereby the processed waste passes between the rows of rollers from the input to the output openings of the chamber and wherein the lower rollers are firmly fixed in their positions whereas the upper rollers can be moved and are attached by springs, which press them on the waste while the rollers counter-rotate; said unit further including a gaseous working medium located in the chamber and having an erosive chemical effect on waste received therein.

2. A unit for processing industrial rubber and plastic waste according to claim 1, wherein the upper rollers have projections on the surface.

3. A unit for processing industrial rubber and plastic waste according to claim 1 wherein the chamber includes side walls and the rollers have respective shafts and wherein the bearings of the rollers of the upper and lower rows of rollers are located outside the chamber and the shafts are sealed by flat packings pressed by a spring at the spot where the shafts enter the side walls of the chamber.

4. A unit for processing industrial rubber and plastic waste according to claim 1, including a frame, a driving engine having a driving sprocket, and a chain, and wherein the rollers are driven by joint shafts having one end received by respective bearings mounted for shifting on the frame and located outside the chamber and having other ends provided with sprockets on which the chain runs to the driving sprocket of the driving engine.

5. A unit for processing industrial rubber and plastic waste according to claim 1, wherein each upper roller and each lower roller has a driving engine electronically controlled and working independently.

6. A unit for processing industrial rubber and plastic waste according to claim 1, wherein the rollers are driven by joint shafts having first ends received in bearings which are located on a frame and having other ends which are provided with toothed wheels mating with idlers and driving toothed wheels and forming a gear set, the joint shafts being driven by a driving engine.

7. A unit for processing industrial rubber and plastic waste according to claim 1, wherein the unit further includes an input area positioned upstream from said chamber and operatively connected thereto by said input opening and having a shiftable closure positioned in said input opening for permitting the passage of waste and/or gaseous working medium between the input area and said chamber, and wherein said gaseous working medium is introduced into and/or exhausted from said chamber from said input area and through said input opening.

8. A unit for processing industrial rubber and plastic waste according to claim 7, including a pipe for introducing said gaseous working medium into said input area.

9. A unit for processing industrial rubber and plastic waste according to claim 1, wherein the unit further includes an output area positioned downstream from said chamber and operatively connected thereto by said output opening and having a shiftable closure positioned in said output opening for permitting the passage of waste and/or gaseous working medium between the output area and said chamber, and wherein said gaseous working medium is introduced into and/or exhausted from said chamber from said output area and through said output opening.

10. A unit for processing industrial rubber and plastic waste according to claim 9, including a pipe for introducing said gaseous working medium into said output area.

11. A unit for processing industrial rubber and plastic waste in a physio-chemical way comprising a substantially gas-tight chamber having an input opening, an output opening and two rows of rollers located in the chamber, the upper row of rollers including bearings and the lower row of rollers having bearings positioned whereby the processed waste passes between the rows of rollers from the input to the output openings of the chamber and wherein the lower rollers are firmly fixed in their positions whereas the upper rollers can be moved and are attached by springs, which press them on the waste while the rollers counter-rotate, the unit including a bottom wall and including a plurality of chambers, one of said chambers being a last chamber for processing the waste passing therethrough, said last chamber having an outer front wall, wherein a worm conveyor is located on the bottom wall inside the unit, and including a discharge chute located under the outer front wall of the last chamber.

* * * * *